2,951,280

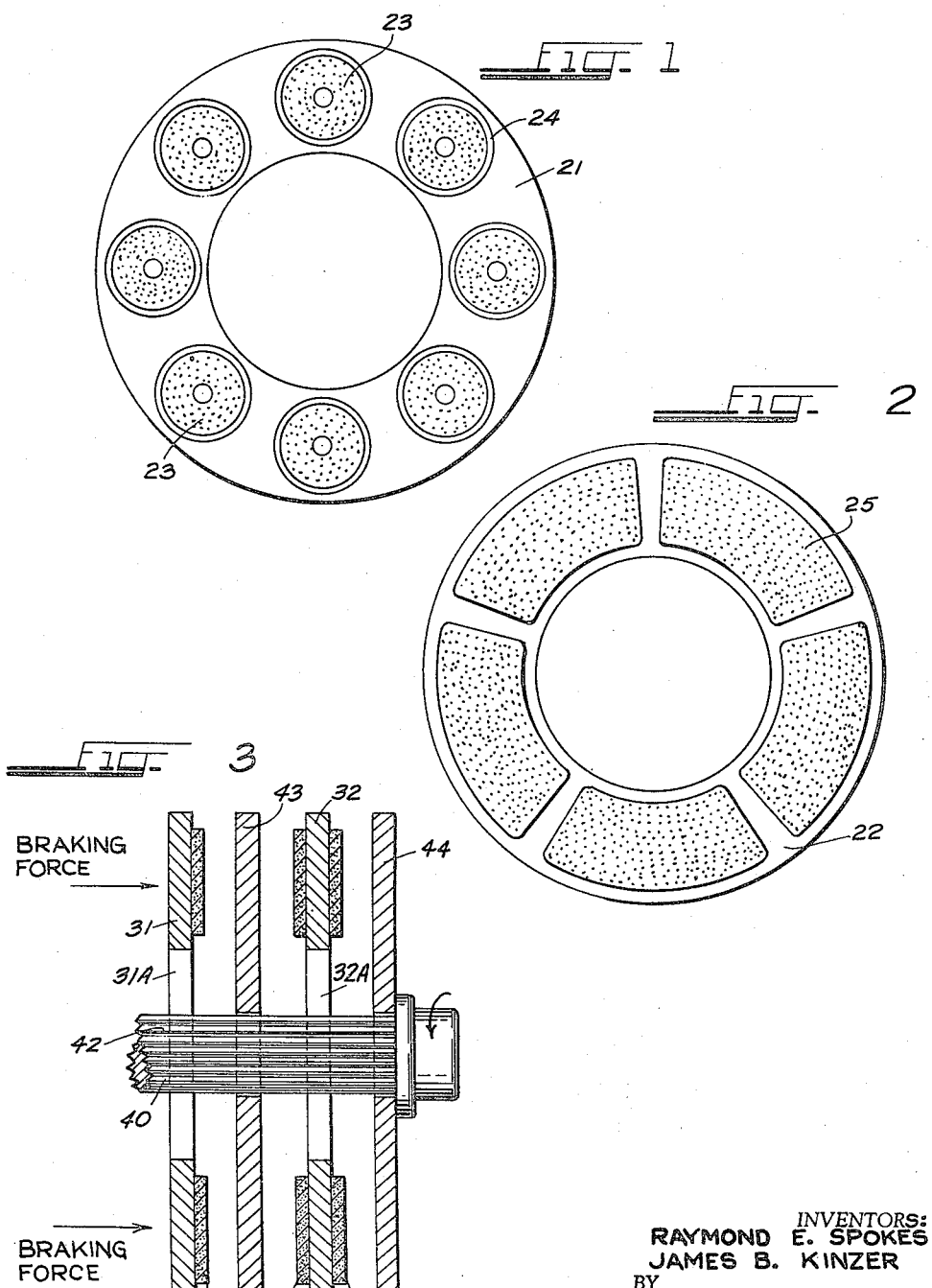

FRICTION ELEMENTS

Raymond E. Spokes, Ann Arbor, Mich., and James B. Kinzer, Wilmette, Ill., assignors to American Brake Shoe Company, New York, N.Y., a corporation of Delaware Filed Jan. 30, 1958, Ser. No. 712,233

4 Claims. (Cl. 29—182.5)

The absorption or transfer of kinetic energy in severe high temperature braking and clutching entails numerous considerations. Friction, of course, is what is entailed under any circumstance, and it might normally be expected that high friction alone is the prime matter for consideration. If this were true, however, then one would simply select as the material for the friction element a component having a satisfactory optimumly high coefficient of friction. There are many materials which are known to have high friction, and among the mineral type materials are silica and alumina which have, in fact, been incorporated in friction elements in finely divided form in a powdered metal matrix. However, those skilled in the art know as a matter of fact that a friction element consisting primarily, let us say, of alumina or silica or both combined is under most circumstances completely unacceptable because of the severe wear and scoring of the opposed member in the friction couple and excessively high friction.

Other factors that must be taken into consideration in selecting a friction element are the tendency for the friction element itself to wear excessively, the smoothness of engagement between the friction element and the opposing member, elimination of torque peaking, constancy of friction throughout its life, that is, absence of what is known as friction decay, and the prevention of excessive transfer of particles of the friction element to the opposing surface. Smoothness of engagement and absence or torque build-up are particularly important in high energy applications.

It will be realized from the foregoing that the development of a satisfactory friction element, particularly for high energy applications such as the braking of intercontinental military aircraft and four engine type commercial aircraft, entails considerably more than simply the selection of a material having the highest optimum degree of friction. Individually, the above mentioned factors and considerations are of the utmost importance, particularly in aircraft braking where an imbalance in any factor cannot be tolerated for obvious reasons.

It has been proposed to incorporate very finely divided silica and very finely divided alumina as friction enhancing materials in a powdered metal matrix to afford a friction element, and while a friction element of this particular kind is perhaps satisfactory under limited or non-severe conditions, such a friction element is not satisfactory for severe braking conditions such as the illustrations mentioned above, and among the reasons for this is the absence of smooth action and the presence of torque build-up or peaking.

Under the present invention, it has been discovered that a highly satisfactory friction element for severe braking operations and the like can be attained by filling a powdered metal matrix with pellets or agglomerates consisting of finely divided particles of alumina and silica bonded to each other. The effect in this instance is one of having dispersed throughout the powdered metal matrix discrete relatively large size (20 to 60 mesh) pellets or bonded agglomerates in contrast to the highly filled state or prior friction elements in which finely divided (200 mesh or finer) silica and alumina are homogeneously distributed throughout a powdered metal matrix. In other words, the friction element in the present instance is characterized by bonded pellets of alumina and slicia that are significantly spaced one from the other throughout the powdered metal matrix, and this is in contrast to what can be considered a continuous dispersion or sprinkling effect in prior powdered metal friction elements of fine individual particles of silica and alumina.

The friction element of the present invention is particularly smooth in action and there is a particular absence of friction decay and torque build-up or peaking. Friction is steady and the coefficient of friction is satisfactory throughout the life of the friction element. It is our opinion that the satisfactory torque and smooth engaging action is probably due for the most part to the fact that each pellet consists of a concentrated association of angled mineral faces within the relatively wide area of the pellet, which imparts a condition of frangibility to intimately associated materials which otherwise in an non-intimate state have almost a complete absence of frangibility.

The desirable characteristics of the present invention can perhaps be further explained on the basis of the action of alumina and slica individually as discrete particles. Alumina and silica have per se been rejected as friction enhancers in a friction element having a powdered metal matrix for high energy applications, and the assigned reason is that these materials undergo fire polishing during application of the friction element, thereby decreasing friction efficiency. Under the present circumstances, however, we have not experienced a decrease in friction efficiency and moreover, torque characteristics and smoothness of coupling and operation during coupling are enhanced. Further, the bonded pellets embodied in the friction element of the present invention have a degree of friability which can be controlled through the binder. These observed phenomena are contrary to what is considered necessary in the art, and yet we believe these characteristics at least in part account for the improvements in the present instance for the following reason. The large pellet has the hard alumina modified by the softer silica, and hence there will be no harsh gouging action of large size alumina on the opposing friction member in the first instance. Now, when the friction element is engaged with its opposing member, the large size pellets produce an effective initial engagement at the initial high speed and energy level of the opposing member or so-called rotor, probably due to the many-faced nature of the bonded alumina-silica pellets consisting of numerous finer particles. This initial engagement soon produces a degree of rupture of the pellets at the face of the friction element, releasing finely divided alumina and silica, the softer silica desirably modifying the harshness of the harder alumina. This type of action is not attainable in a friction element where tiny individual particles of alumina or silica are individually anchored tightly in place. We are therefore able to use silica and alumina, known to have a good friction level, in a friction element for high energy applications without experiencing the reported disadvantages of these materials.

In producing friction elements in accordance with the present invention, bonded pellets of alumina and silica are produced in a manner to be explained in detail hereinbelow and these preferably have a particle size of between 20 and 60 mesh in contrast to the original state of the alumina and silica approximately of 200 mesh or finer. The pellets thus afforded are then mixed with the powdered metals which are to constitute the matrix of the friction element, and after a uniform mix has been obtained a selected quantity of the powdered material containing the pellets is then sintered under pressure in a mold which is the shape of the desired friction element. The friction element can, of course, be of many different shapes such as blocks, discs, annular segments and the like, and are secured to a support or stator either mechanically or by fusion bonding. The sintering conditions are not critical and depend upon the nature of the matrix, a sufficient temperature being employed to produce welding together of the powdered metal particles and a sufficient pressure being used to attain the desired degree of density and coalescence during sintering. It is important to point out that neither during production of the bonded pellets nor during the sintering of the friction element nor during fusion bonding thereof to the rotor, is there any significant mineralogical or chemical change in alumina or silica. This will be explained in somewhat greater detail below.

The primary object of the present invention is, therefore, to incorporate in the metallic matrix of a high energy friction element, pellets consisting of intimately bonded finely divided particles of alumina and silica in intimate association, thereby enabling the inherent characteristics of silica and alumina to be utilized for high energy friction applications without experiencing the reported disadvantage of per se particles of alumina and silica in high energy friction applications, while achieving highly advantageous results manifested by smooth engagement, absence of friction decay and absence of torque peaking or build-up.

Another object of the present invention is to achieve, in a friction element for high energy applications, smooth engagement, good life, optimum friction, and little friction decay by incorporating in the friction element pellet bodies, each such body consisting of particles of fine alumina and silica intimately bonded together by an inorganic binder.

Other and further objects of the present invention will be apparent from the following description which by way of example sets forth preferred embodiments of our invention and the principles thereof and what we now consider to be the best mode contemplated for applying those principles. Other embodiments of the invention embodying the same or equivalent principles may be used and structural changes may be made as desired by those skilled in the art without departing from the present invention and the purview of the appended claims.

In the drawings:

Figs. 1 and 2 are schematic plan views of a friction couple members provided with friction elements of the present invention;

Fig. 3 is a simplified and somewhat schematic sectional view of a friction couple;

Figure 4:
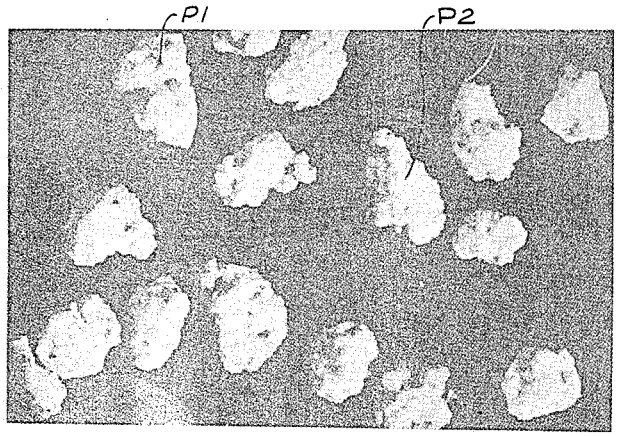
Figure 5:
Figure 6:

Fig. 4 is a microphotograph of pellets composed in accordance with the present invention, Fig. 5 is a microphotograph of a friction element, after sintering and before use, of a friction element incorporating pellets of the present invention; and Fig. 6 is a microphotograph of a friction element incorporating pellets of the present invention and after being subjected to a severe aircraft brake test.

A powdered metal matrix is a well known matrix for friction elements and has been constantly used in the art in recent years. Its chief advantage, especially if composed of good heat conductive material, is its ability to be readily shaped by powdered metal techniques and to conduct heat away from the area of interface engagement with the rotor or opposing member of the friction couple. Additionally, being of metal, such matrix resists thermal break-down and thermal warpage in the first instance, and it inherently conducts heat rapidly away from the engaging face thereof and into the "sink" of the backing or support member (which carries the friction element) and the elements beyond the support member.

Thus, the essential nature and desirable attributes of a powdered metal matrix are well known in the friction element art, and such is preferably used in accordance with the present invention as the matrix which holds the alumina-silica pellets. The particular composition is for the most part varied in accordance with operating conditions. The strongest form for the most severe situations of mechanical shock and wear is represented by powdered iron, but powdered copper or bronze can for the most part be advantageously employed just as well, being somewhat more ductile than iron and also more heat conductive. Whatever be the nature of the powdered metal matrix, the pellets of the present invention and of the kind photographed in Fig. 4 of the drawing herein are mixed with the metal powders before sintering, and it may be of advantage in some instances, as is well known in the art, to add to the mixture a friction modifier or lubricant such as finely divided lead or graphite or both.

There is nothing particularly critical about proportions under the present invention. The matrix is essentially a binder for the friction enhancing alumina-silica pellets, and hence sufficient of the metal powders to be sintered are selected which will assure an effective bonding of the alumina-silica pellets. On the other hand, no more of the pellets need be used beyond that required to produce an optimum friction and wear level, since any amount of pellets beyond this amount would be waste and surplusage. Therefore, the alumina-silica pellet content in the friction element may be as low as about five percent based on the total weight of the friction element as representative of the lower range where an operative minimum effect of the alumina-silica pellets is present. On the other hand, the pellet content may be raised up to a percentage of about fifty percent to develop the highest effective action of the alumina-silica bonded aggregates or pellets within the realm of effective bonding by the sintered powdered metals.

If graphite or lead is to be used as a friction modifier, such will not ordinarily exceed ten percent by weight of the friction element composition. As is well known in the art, a friction modifier is simply a lubricant when viewed from the relative standpoint of the essential friction enhancing material, and is usually added in specialized circumstances where, for some reason or other, it is beneficial to tone down or make less harsh the action of the friction enhancer.

Suitable examples representing formulations in accordance with the present invention are as follows:

EXAMPLE 1—BROAD RANGES

| Material: | Parts by weight |
|---|---|
| Powdered iron or copper (matrix) | 95–50 |
| Pellets[1] of alumina and silica (−20 +60 mesh) | 5–50 |

[1] Includes binder

Example 1 is to be followed as the basis for the extremes of possible variations in selecting the basic components or essential ingredients. As was mentioned, friction modifiers may be added contributing their own distinct effects, and some tin will in most instances be used as an aid to sintering and coalescence. Thus, a more specific example is as follows:

EXAMPLE 2—COPPER OR IRON BASE

| Material: | Parts by weight |
|---|---|
| Powdered copper (or iron) | 50–75 |
| Powdered tin | 4–10 |
| Powdered lead | 1–5 |
| Finely divided graphite (−325 mesh) | 3–10 |
| Pellets[1] of alumina and silica (−20 +60 mesh) | 10–30 |

[1] Includes binder

The above examples represent the mixture to be pressed and sintered. The constituents are mixed to a uniformly distributed state, and a selected quantity is then introduced into the mold for compaction under pressure. The mold embodies the dimensions of the finished part, and although hot-pressing may be used, that is, combined pressing and sintering, we prefer to press the powders under high pressure to produce a so-called green compact densified to the desired state by pressure. The compact is then sintered, preferably under light pressure, for a period of time and at a temperature known to produce welding or fusion joining of the metal powders, and at the completion of sintering the pellets consisting of intimately bonded alumina-silica particles or fines are effectively anchored in place and an operative friction element is produced. During sintering, there is no chemical or physical alteration of the finely divided individual alumina and silica particles within the pellet bodies, because the sintering temperature is well below the fusion temperature of alumina and silica. In fact, sintering at temperatures to be mentioned serves further to harden the binder that cements together in the pellets the finely divided alumina and silica.

In the instance of a copper base powdered metal matrix, some tin is advantageously employed up to about ten percent by weight of the mixture for promoting the fusion union of the copper powders, and tin may likewise be employed for this purpose in the instance of a matrix consisting essentially of iron powders. Sintering is, of course, carried out at a somewhat higher temperature for iron, say at about 1800–2000° F. in contrast to the sintering temperature for copper base materials which is in the realm of 1500–1700° F.

The pressing and sintering conditions for copper and iron powders have long been established in the art. The pressures used to produce the green compacts also vary with the matrix material. For an iron base matrix, pressures of between fifteen to twenty tons per square inch are used, depending upon the most advantageous density desired for the matrix as determined by the particular kind of installation. Because of the softer nature of copper, like variations in density are attained by using lower pressures of about eleven to fifteen tons per square inch. Sintering is preferably conducted using slight pressure, say of the order of 150 p.s.i. or slightly more for about one hour in the instance of a copper base matrix and a pellet content within the foregoing examples, and a pressure of about 250 p.s.i. or slightly less at 1800° F. for one hour with an iron base matrix and a pellet content within the foregoing examples. Such relatively low order pressures during sintering are to be distinguished from so-called hot-pressing wherein both compaction of the loose powders and sintering thereof are carried out simultaneously, although as mentioned, this latter technique may be employed within the purview of the present invention.

The friction elements consisting of the sintered materials are mounted on a supporting member or so-called stator of the desired form and dimension to be embodied in the aircraft brake or like friction couple. Again, we rely upon known practices in this regard, but it may be mentioned that the friction element can be either joined mechanically to the stator, or fusion bonded thereto by plating the stator with copper or nickel and then heating the assembly to a temperature sufficient to produce a weld between the stator and the friction element juxtaposed thereon, slight pressure being used to assure good contact between the plated stator and the back of the friction element.

Friction elements of the kind contemplated by the present invention are illustrated in Figs. 1 and 2 as mounted on ferrous metal stators 21 and 22. The stators in each instance are annular as illustrative of one mechanical form of a stator for a high energy brake, but the shape of the stator will vary depending upon the particular type of brake structure, or clutch structure where the present invention is embodied in a high energy industrial clutch. In Fig. 1, the friction elements are in the form of discs or buttons 23 each composed in accordance with the present invention disclosed above, and in this instance the buttons 23 are contained in a complemental cup 24 which may be mechanically joined at their backs in a suitable fashion to the stator 21.

In Fig. 2 of the drawing, the friction elements are in the form of arcuate segments 25 each of the composition of the present invention, and these segments are bonded to the stator 22 by fusion welding described above.

Fig. 3 of the drawing schematically illustrates the essentials of an aircraft brake structure in which friction elements of the present invention are secured to a stator. Thus, the brake couple illustrated in Fig. 3 comprises a pair of annular stators 31 and 32 having enlarged openings 31A and 32A in the medial portions thereof, thus being similar to the stators of Figs. 1 and 2. The stator 31 is provided on one side with a plurality of friction elements 35 of the present invention which may be of the form illustrated in Figs. 1 or 2, and it will be observed that the stator 32 has like friction elements provided on both sides thereof. The shaft 40 relative to which the stators 31 and 32 are concentrically supported in a convenient manner (not shown) can be assumed to be the rotating axle of an aircraft wheel. The stators do not rotate with the axle but can be moved axially therealong. The axle is splined at 42 or otherwise provided with keys for rotating a pair of discs 43 and 44 which are provided with teeth about an inner diameter and which teeth fit complementally in the spaces between the splines or keys on the axle 42. Hence, the discs are adapted to move axially along the splines or keys 42 while rotating with the axle. The discs 43 and 44 represent the so-called opposing members for the stators 31 and 32, such that by applying a hydraulic braking force to at least the outermost of the stators as indicated by legend in Fig. 3, the friction elements are brought into tight engagement with the rotating discs 43 and 44 thereby applying a retarding braking force to the axle 40.

*Production of the pellets*

The pellets to be incorporated in the elements of the present invention are produced by dispersing very finely divided silica and alumina in an inorganic binder and then causing the binder to set up and harden about the finely divided alumina and silica. In most instances, the bound particles of alumina and silica will initially be in a sheet form, and this sheet is then broken up or ground to produce pellets of the desired mesh size. The most effective action of the pellets is developed by using pellets of −20 to +60 mesh, and originally, in their unassociated form, the silica and alumina are at least 200 mesh or finer, in so-called flour form.

The particular binder may take many different forms and may vary from what can be termed a soft form as represented by sodium silicate to a hard form as represented by magnesium oxide.

Thus, the binder for the alumina and the silica flours is simply an inorganic material which is capable of clinging to the particles of silica and alumina and which is susceptible to hardening and setting about the particles of silica and alumina to cement the same together. In the instance of sodium silicate, a hydrous form is used, namely, sodium silicate which in hydrous form especially when further diluted with water, will flow about and wet the particles, after which the mix is baked to drive out water and cause the sodium silicate per se to cement the particles of silica and alumina. Other binders may be used such as Kaolinite which is a form of clay and magnesite which when baked converts into magnesium oxide. Thus, in the instance of Kaolinite and magnesite, these dry, naturally occurring materials are mixed with the alumina and silica particles, sufficient water is added to produce a plastic mass capable of being stirred, and the mix is then baked at a sufficient temperature to harden and set the binder.

EXAMPLE 3—PELLET PRODUCTION

| Material: | Parts by weight |
|---|---|
| Alumina (200 mesh or finer) | 44.4 |
| Silica flour | 17.4 |
| Reworked pellet fines | 46.6 |
| Sodium silicate (hydrous—37.6% strength) | 21.7 |
| Water | 8.8 |

The alumina, silica, and reworked pellet fines obtained from previous pellet grinding (to be described) are first added in a mixer and then the hydrous form of sodium silicate ("water-glass") and free water are added. These are mixed for thirty minutes, the free water contributing to the formation of a slurry capable of ready blending in the mixer. The blend is then discharged into a three-inch deep tray and baked at 250° F. for seven hours followed by a bake at 800° F. for eight hours to produce a hard solid mass bound by anhydrous sodium silicate.

The solid mass is removed from the tray and put through a jaw crusher with jaws set at three-sixteenths inches. The crushed particles are then run over a one-eighth inch screen. The "minus" one-eighth inch particles are then sifted on 20 mesh, 40 mesh and 60 mesh screens, the purpose of the middle screen being to reduce the load on the 60 mesh screen. The "plus" one-eighth inch material from the one-eighth inch screen and the +20 mesh material from the 20 mesh screen are run through a roll crusher set at 0.035 inch and then re-run through the above-mentioned 20, 40 and 60 mesh screens; recrush any remaining +20 mesh material in the roll crusher set 0.025 inch, and re-screen. Any +20 mesh material yet remaining is saved for the next batch of baked sodium silicate bonded alumina-silica mass when to be roll crushed at 0.025 inch roll crusher setting. The yield of −20 to +60 mesh alumina-silica pellets thus produced, and shown in Fig. 4 of the drawings herein (the pellets shown in Fig. 4 were heated to 1000° C. for a reason to be explained) should be about sixty percent, and the typical mesh screen distribution is as follows:

| | Percent |
|---|---|
| −20+30 | 50 |
| −30+40 | 25 |
| −40+60 | 25 |

The production of alumina-silica pellets using magnesite or Kaolinite (bake at about 400° C.) or like clay-like material as a binder is essentially the same as the foregoing. The result in any instance is purely physical and no chemical changes are involved during the time the mass is being baked to harden the binder. The Kaolinite during baking hardens like any other ceramic or mineral-type binder material, and the magnesite transforms whole or in part to magnesium oxide which becomes the essential binder cementing the particles of alumina and silica.

The three named binders are selected on the basis of cost, availability, refractoriness and optimum rugged binder properties capable of remaining physically and thermally stable during pressing and sintering of the friction elements as well as during use of the friction element in high energy applications such as aircraft braking and industrial clutching. Hence, numerous substitutions may be made where feasible, and dry binders which fuse on baking can be used. In fact, all the binders specified herein are those which fuse to the alumina and silica fines upon being heated in contact with the silica and alumina fines.

The "weakest" of the pellets, that is, those bonded by sodium silicate, after being sintered and used under severe high energy conditions showed, upon X-ray, optical and microscopic studies of the corresponding pellets in a used friction element, that the alumina remained present as corundum, the silica remained present as quartz, and the sodium silicate binder was for the most part amorphous and dissipated among those pellets at the engaged surface of the friction element. The pellets examined thus showed no change in chemical or mineralogical phase.

To further verify that no mineralogical or chemical change occurs in the pellets during sintering, pellets per se as produced in accordance with Example 3 were heated to 1000° C. and then examined for details of structure, but again there was no change, and the pellets thus heated are those as shown in Fig. 4 of the drawings.

As mentioned above, pellets produced in accordance with Example 3 of the present invention are shown in detail in Fig. 4 of the drawings herein, these pellets having been photographed under a microscope. The many-faced nature of pellets is clearly observable, and in the original photographs is most distinct. Note in particular the sharp, angular, heavy-bodied nature of the pellets P1 and P2 in Fig. 4 of the drawings. Figs. 5 of the drawings, which is another microphotograph, shows the powdered metal matrix M of a friction element produced in accordance with the present invention and containing pellet inclusions PM produced in accordance with Example 3 hereof, Fig. 5 showing the state of the friction element just after sintering. Note in Fig. 5 how the angular nature of the pellets prevails. Fig. 6 of the drawings, which is also a microphotograph, shows the friction element after a severe braking engagement at high temperature and a high level of kinetic energy.

It will be seen from the foregoing that under the present invention we are able to use in the powdered metal matrix of a high energy friction element finely divided silica and alumina intimately bonded and associated to form composite aggregates or pellets, whereas heretofore finely divided silica and alumina in physically uncombined form, that is, indiscriminately in happenstance state added as individual per se particles to the matrix of a powdered metal friction element have not performed satisfactorily under high energy conditions. Hence while we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A powdered metal friction element for high energy applications and consisting essentially of a thermally stable heat-conductive matrix of powdered metal particles selected from the group consisting of powdered copper and powdered iron densified under high pressure and sintered together to join the individual particles of metal rigidly and permanently one to the other, and said matrix having dispersed therein pellets composed of intimately bonded finely divided individual particles of alumina and individual particles of silica, said finely divided alumina and silica particles in each pellet being chemically uncombined and intimately bonded one to the other in each pellet by an inorganic binder selected from the group consisting of magnesium oxide, kaolinite and anhydrous sodium silicate which cements and firmly bonds together said particles of alumina and silica, said pellets being approximately of −20 to +60 mesh size and present in an amount of between about five and fifty percent by weight of the friction element, and the finely divided alumina and silica particles being of approximately 200 mesh size.

2. A friction couple member adapted to be engaged with an opposing member in the friction couple and consisting essentially of a metallic support having secured thereto a powdered metal friction element for high energy applications, said friction element being composed of a thermally stable heat-conductive matrix of powdered metal particles densified under high pressure and sintered together to join the individual particles of powdered metal rigidly and permanently one to the other, and said matrix having dispersed therein pellets composed of intimately bonded finely divided individual particles of alumina and individual particles of silica, said finely divided alumina and silica particles in each pellet being chemically uncombined and intimately bonded physically one to the other by an inorganic binder selected from the group consisting of magnesium oxide, kaolinite and anhydrous sodium silicate, said pellets being approximately of —20 to +60 mesh size and present in an amount of between about five and fifty percent by weight of the friction element.

3. A method of producing a powdered metal friction element consisting essentially of, mixing finely divided individual alumina particles and silica particles in the presence of an inorganic binder capable of being fused to said particles, said particles being substantially finer than —20 to +60 mesh and said binder being selected from the group consisting of magnesium oxide, kaolinite and anhydrous sodium silicate heating the mixture of particles and binder to cause said binder to bond said particles together in a unitary sheet-like mass, dividing said mass into pellet bodies of about —20 to +60 mesh and each consisting of chemically uncombined finely divided particles of alumina and finely divided particles of silica bonded by said binder, mixing a selected amount of said pellet bodies with powdered metal to afford a mixture wherein the pellet bodies represent about 5 to 50 percent by weight of the mixture of pellet bodies and powdered metal, and pressing and sintering said mixtures of pellet bodies and powdered metal.

4. A powdered metal friction element for high energy applications and consisting essentially of a thermally stable heat conductive matrix of powdered metal particles densified under high pressure and sintered together to join the individual particles of metal rigidly and permanently one to the other, and said matrix having dispersed therein pellets composed of intimately bonded finely divided individual particles of alumina and individual particles of silica, said finely divided alumina and silica particles in each pellet being chemically uncombined and intimately bonded one to the other in each pellet by an inorganic binder selected from the group consisting of magnesium oxide, kaolinite and anhydrous sodium silicate which cements and firmly bonds together said particles of alumina and silica, said pellets being approximately of —20 to +60 mesh size and present in an amount of between about 5 and 50 percent by weight of the friction element, and the finely divided alumina and silica particles being of a mesh size substantially finer than the mesh size of said pellets.

References Cited in the file of this patent
UNITED STATES PATENTS

| | | |
|---|---|---|
| 2,072,070 | Fisher | Feb. 23, 1937 |
| 2,784,105 | Stedman et al. | Mar. 5, 1957 |